(12) United States Patent
Makino

(10) Patent No.: US 10,962,503 B2
(45) Date of Patent: Mar. 30, 2021

(54) SURFACE CHARACTERISTIC INSPECTION METHOD AND SURFACE CHARACTERISTIC INSPECTION DEVICE

(71) Applicant: SINTOKOGIO, LTD., Nagoya (JP)

(72) Inventor: Yoshiyasu Makino, Toyokawa (JP)

(73) Assignee: SINTOKOGIO, LTD., Nagoya (JP)

(*) Notice: Subject to any disclaimer, the term of this patent is extended or adjusted under 35 U.S.C. 154(b) by 121 days.

(21) Appl. No.: 16/338,937

(22) PCT Filed: Jun. 1, 2017

(86) PCT No.: PCT/JP2017/020479
§ 371 (c)(1),
(2) Date: Apr. 2, 2019

(87) PCT Pub. No.: WO2018/066171
PCT Pub. Date: Apr. 12, 2018

(65) Prior Publication Data
US 2020/0011833 A1 Jan. 9, 2020

(30) Foreign Application Priority Data
Oct. 6, 2016 (JP) .............................. JP2016-198461

(51) Int. Cl.
*G01N 27/90* (2021.01)
*G01N 27/80* (2006.01)

(52) U.S. Cl.
CPC ......... *G01N 27/9046* (2013.01); *G01N 27/80* (2013.01); *G01N 27/9086* (2013.01)

(58) Field of Classification Search
CPC ............. G01N 27/902; G01N 27/9046; G01N 23/225; G01N 27/90; G01N 27/9033;
(Continued)

(56) References Cited

U.S. PATENT DOCUMENTS 4,445,089 A * 4/1984 Harrison ............ G01N 27/9046
324/232
5,777,469 A * 7/1998 Hockey .............. G01N 27/9053
324/238
(Continued)

FOREIGN PATENT DOCUMENTS

JP S55-007630 1/1980
JP S60-202355 10/1985
(Continued)

OTHER PUBLICATIONS

Extended European Search Report for Europe Application No. 17858011.4, dated Feb. 4, 2020, 8 pages.

*Primary Examiner* — Vinh P Nguyen
(74) *Attorney, Agent, or Firm* — Brinks Gilson & Lione

(57) ABSTRACT

The present invention provides a surface property inspection method including a step of setting a resistance ratio between resistors R1 and R2 of an AC bridge circuit 20 in a surface properly inspection apparatus 1. The step includes a step for placing a non-surface-treated reference test pieces S on a reference detector 22 and an inspection detector 23 and measuring a first setting output signal while changing the resistance ratio γ, a step for placing the reference test piece S on the reference detector 22, placing a surface-treated setting test piece on the inspection detector 23, and measuring a second setting output signal while changing the resistance ratio, a step for calculating the differential value between the first and second output signals, and a step for setting the resistance ratio so that the absolute value of the differential value is maximized.

15 Claims, 12 Drawing Sheets

(58) Field of Classification Search
CPC .. G01N 27/82; G01N 27/9013; G01N 27/904;
G01N 27/9086; G01N 27/025; G01N
27/72; G01N 27/9006; G01N 19/08;
G01N 2021/8918; G01N 27/20; G01N
27/24; G01N 27/61; G01N 27/80; G01N
27/9073; G01L 1/127; G01L 3/105; G01R
33/12; G01R 33/0354; G01R 15/18;
G01R 19/10; G01R 27/26; B24B 37/013;
B24B 49/105; G01M 5/005; G01M
5/0083; G01M 19/00; B24C 1/10
See application file for complete search history.

(56) References Cited

U.S. PATENT DOCUMENTS

| | | | |
|---|---|---|---|
| 9,157,892 B2 * | 10/2015 | Makino | G01N 27/9046 |
| 9,638,668 B2 * | 5/2017 | Makino | C21D 7/06 |
| 9,964,520 B2 * | 5/2018 | Makino | G01N 27/90 |
| 10,048,227 B2 * | 8/2018 | Makino | G01N 27/9046 |
| 10,718,739 B2 * | 7/2020 | Makino | C21D 7/06 |
| 2014/0084910 A1 | 3/2014 | Makino | |
| 2016/0341699 A1 | 11/2016 | Makino et al. | |
| 2017/0108470 A1 * | 4/2017 | Makino | G01N 27/9033 |

FOREIGN PATENT DOCUMENTS

| | | |
|---|---|---|
| JP | 2013-529286 | 7/2013 |
| WO | WO 2015-107725 | 7/2015 |
| WO | WO 2015/145833 A1 | 10/2015 |

* cited by examiner

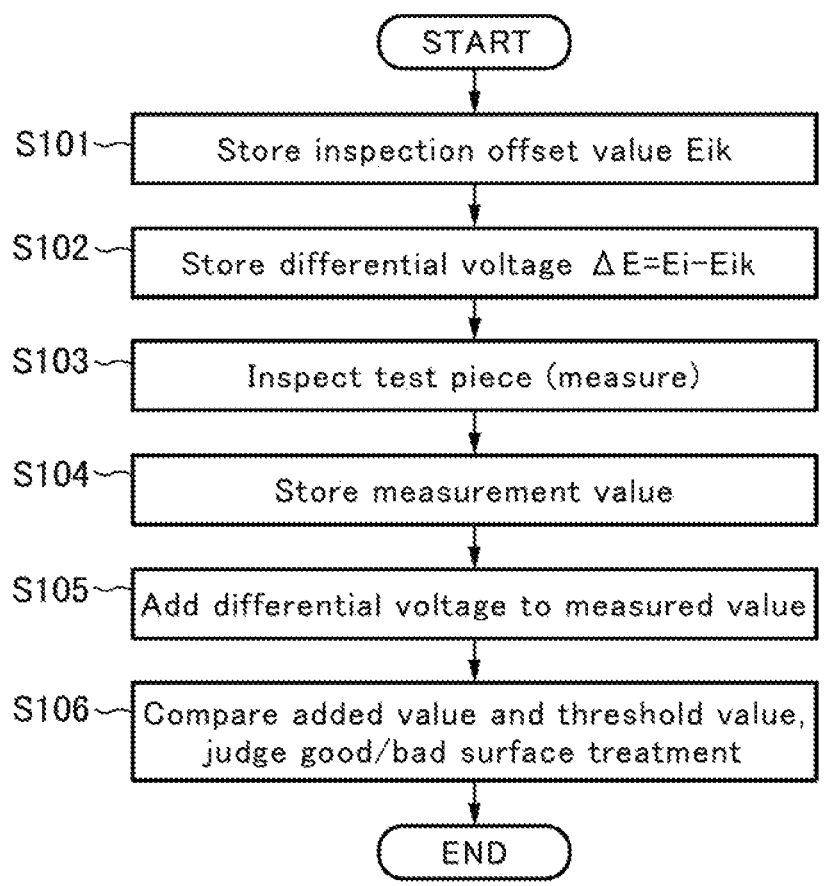

SURFACE CHARACTERISTIC INSPECTION METHOD AND SURFACE CHARACTERISTIC INSPECTION DEVICE

This application is a 371 application of PCT/JP2017/020479 having an international filing date of Jun. 1, 2017, which claims priority to JP2016-198461 filed Oct. 6, 2016, the entire content of each of which is incorporated herein by reference.

TECHNICAL FIELD

The present invention pertains to a surface property inspection apparatus and surface property inspection method for non-destructively inspecting the surface condition of a treated material surface-treated by heat treatment such as carburization hardening and nitriding, or by shot peening.

BACKGROUND ART

In steel products such as gears or shafts used as automobile parts or the like, surface treatments imparting residual compression stress, such as surface hardening by a heat treatment such as carburizing and quenching, or by shot peening, are performed to improve wear-resistance, fatigue strength, and time like.

In the past, evaluation of post-surface treatment surface properties such as residual stress or hardness in the above products was performed by sample destructive testing. This resulted in the problem that not all products could be directly inspected, and products which were inspected became unusable, as inspection was destructive. The present applicants therefore propose a surface property inspection method in which a difference in electrical properties depending on whether the piece is surface-treated is detected using an AC bridge circuit, and surface properties are inspected based on that detection signal.

PRIOR ART REFERENCES

Patent Documents

Patent Document WO2015/10

SUMMARY OF THE INVENTION

Problems the Invention Seeks to Resolve

In recent years, with the growing diversity of test pieces, there has been a trend toward lower output voltages used to inspect high void ratio test pieces such as large-diameter wound sprints or valve springs, or test pieces with sloped surfaces such as plate springs or diaphragms compared to gears and the like. Another trend observed is toward lower output voltages even when the shape and dimensions of an inspection detector are changed. To effectively inspect the above-described types of test pieces, it is therefore desirable to improve detection sensitivities even further. As the result of assiduous research, the inventors have discovered that the above drop in output voltage is due to changes in coil distributed capacitance caused by the placement of a test piece on an inspection detector whereby that change in distributed capacitance causes output voltage phase changes, and have developed a method for greatly increasing output voltage for determining the presence or absence of surface treatment.

The present invention has the object of providing a surface property inspection method which, by increasing output voltage, accurately inspects the surface treatment state of treated materials treated by heat treatments such as carburization hardening or nitriding, or by shot-peening or the like.

Means for Resolving Problem

To accomplish the above object, the present invention is a surface property inspection method for inspecting surface properties of a surface-treated test piece comprising preparing a surface property inspection apparatus, whereby the surface property inspection apparatus comprises an AC bridge circuit, an AC power supply configured to supply AC power to the AC bridge circuit, and an evaluation apparatus configured to evaluate the surface properties of the test piece based on an output signal from the AC bridge circuit, whereby the AC bridge circuit comprises a variable resistor constituted so that a resistance ratio between a first resistor and a second resistor is variable; an inspection detector including a coil capable of exciting AC magnetism and formed to dispose the coil so that it excites an eddy current in the test piece; and a reference detector on which a reference test piece of the same structure as the test piece is disposed, for detecting a reference state serving as reference for comparison with the output from the inspection detector, whereby the first resistor, the second resistor, the reference detector, and the inspection detector constitute a bridge circuit. The method further comprises setting the resistance ratio between the first resistor and the second resistor, acquiring the output signal from the AC bridge circuit by supplying AC power to the AC bridge circuit, in a state whereby the inspection detector is detecting electromagnetic characteristics of the test piece, and the reference detector is detecting the reference state, and evaluating the output signal acquired in the acquiring, the output signal being compared with a predetermined threshold value to evaluate the surface properties of the test piece; and the setting comprising first signal acquiring wherein first setting output signals are acquired relative to multiple resistance ratios in a state where un-surface-treated reference test pieces are disposed on the reference detector and the inspection detector, respectively; second signal acquiring wherein second setting output signals are acquired relative to multiple resistance ratios in a state where one of the un-surface-treated reference test pieces is disposed on the reference detector and a surface-treated setting test piece is disposed on the inspection detector; determining the resistance ratio set in the acquiring, based on the first setting output signals acquired in the first signal acquiring and on the second setting output signals acquired in the second signal acquiring.

In the invention thus constituted, an eddy current can be excited in a test piece by an inspection detector coil, and surface properties of the test piece can be evaluated by comparing the output signal output from an AC bridge circuit to a threshold value.

Here, because the resistance ratio set in the inspection signal acquisition step is determined based on a first setting output signal acquired in the first signal acquisition step and a second setting output signal acquired in the second signal acquisition step, the output voltage from the AC bridge circuit can be increased, and the surface treatment state of treated material to which surface treatment has been applied can be accurately inspected.

Here the term "same structure" means that materials and shapes are the same. "Surface properties" describes "properties from the outermost surface of the test piece to the inside perimeter surface influential layer."

In the present invention, preferably, a technical means is used in the determining of the resistance ratio, and the resistance ratio to be set in the acquiring of the output signal is determined based on the relationships between the first and the second setting output signals which are acquired with respect to the same resistance ratio.

In the invention thus constituted, a resistance ratio is determined based on the relationship between a first setting output signal and a second setting output signal, therefore a resistance ratio can be obtained at which the output voltage from the AC bridge circuit will reliably increase.

The present invention preferably uses a technical means wherein in the determining of the resistance ratio, the resistance ratio is determined at which the absolute value of the difference between the first setting output signal and the second setting output signal which are acquired with respect to the same resistance ratio, is maximal, and the determined resistance ratio is used in the acquiring of the output signal.

In the present invention thus constituted, the resistance ratio at which the absolute value of the difference between the first setting output signal and the second setting output signal is maximal is set in the inspection signal acquisition step, therefore the output voltage used for inspection can be increased so that the surface treatment state of surface treatment-applied treated material can be accurately inspected.

The present invention preferably uses a technical means wherein the test piece has a sloped surface, and the coil of the inspection detector is formed so that a surface of the coil extends along the sloped surface of the test piece to which surface treatment has been applied, and the eddy current is excited on the sloped surface of the test piece.

The present invention preferably uses a technical means wherein the coil of the inspection detector is wound in a convex shape so that the convex shape is inserted into a concave surface of the test piece to which surface treatment has been applied, and the eddy current is excited on the concave surface.

In the invention thus constituted, increases in output voltage phase changes due to changes in distributed capacitance in the coil caused by test piece shape can be prevented, and surface properties can be accurately inspected.

The present invention preferably uses a technical means wherein the coil of the inspection detector is wound on a sloped surface of a bobbin.

In the invention thus constituted, high accuracy inspection can be performed even on test pieces with sloped surfaces, which were previously difficult to inspect. For test pieces of differing dimensions, positions on the test piece along a sloped surface can be disposed at positions respectively suitable for measurement, so that test pieces for many different part types and shapes can be evaluated using a single inspection detector.

The present invention preferably uses a technical means wherein the surface property inspection apparatus further comprises a first inspection detector and a second inspection detector which are mutually opposed, and the first and the second inspection detectors are disposed inspection areas of the test piece which are opposed to the respective inspection detectors.

In test pieces on which surface treatment has been applied to both front and back surfaces of a member such as a disk spring, inspection should be performed on inspection regions at two opposing locations. The invention thus constituted can be advantageously used to inspect such test pieces.

In the present invention, preferably, the surface property inspection apparatus further comprises a transport device configured to transport the test piece, whereby the test piece has on both sides surface-treated concave and convex surfaces. The first inspection detector has a coil wound either in a convex shape for insertion into the concave surface, or in a concave shape to receive the convex surface, so that the eddy current is excited in either the concave surface or the convex surface of the test piece. The second inspection detector has a coil wound either in a convex shape for insertion into the concave surface, or in a concave shape to receive the convex surface, so that the eddy current is excited in the other either concave surface or convex surface of the test piece, and the acquiring of the output signal comprising first transporting the test piece between the first inspection detector and the second inspection detector; first acquiring the output signal from the AC bridge circuit by disposing the test piece on the coil of the first inspection detector and exciting the eddy current in the concave surface or the convex surface of the test piece; second transporting the test piece from the first inspection detector to the second inspection detector; and second acquiring the output signal from the AC bridge circuit by disposing the test piece on the coil of the second inspection detector and exciting the eddy current in the concave surface or the convex surface of the test piece.

In the invention thus constituted, test pieces are transported by a transport device to enable continuous inspection of a first inspection area and second inspection area, thus enabling efficient inspection. Also, by affixing the inspection detector and transporting the test piece to perform inspection, the inspection detector installation environment is stabilized, and a higher accuracy inspection can be achieved.

The invention is a surface property inspection apparatus for inspecting surface properties of a test piece subjected to surface treatment furnished with an AC bridge circuit, an AC power supply for supplying AC power to the AC bridge circuit, and an evaluation apparatus for evaluating surface properties of the test piece based on an output signal from the AC bridge circuit, whereby the AC bridge circuit comprises a variable resistor constituted so that a resistance ratio between a first resistor and a second resistor is variable, an inspection detector including a coil capable of exciting AC magnetism and formed to dispose the coil so that it excites an eddy current in the test piece, and a reference detector on which a reference test piece of the same structure as the test piece is disposed, for detecting a reference state serving as reference for comparison with the output from the inspection detector, whereby the first resistor, the second resistor, the reference detector, and the inspection detector constitute a bridge circuit, and wherein the coil of the inspection detector is wound on a sloped surface so as to follow the sloped surface of the test piece.

The surface property inspection apparatus of the present invention preferably uses a technical means wherein the coil of the inspection detector is wound in a convex shape and inserted into a concave surface of the test piece to which surface treatment has been applied, so that the eddy current is excited on the concave surface.

The surface property inspection apparatus of the present invention preferably uses a technical means wherein the coil of the inspection detector comprises a bobbin having a convex wall surface and a convex cover covering the outer perimeter surface of the convex wall surface, and conductor of the coil is wound on the outer perimeter surface of the convex wall surface, and the convex cover covers the wound conductor and is inserted into the concave surface of the test piece so that the eddy current is excited in the concave surface of the test piece to which the surface treatment has been applied.

The surface properly inspection apparatus of the present invention preferably uses a technical means wherein the coil of the inspection detector is wound in a concave shape receiving a convex surface of the test piece to which surface treatment is applied, so that the eddy current is excited on the convex surface.

The surface property inspection apparatus of the present invention preferably uses a technical means wherein the coil of the inspection detector comprises a bobbin having a convex wall surface, and conductor of the coil is wound on an outer perimeter surface of the convex wall surface, and wherein an inner perimeter surface of the bobbin receives a convex surface of the test piece so that the eddy current is excited on the convex surface of the test piece to which the surface treatment has been applied.

The surface property inspection apparatus of the present invention preferably uses a technical means wherein the inspection detector comprises a first inspection detector and a second inspection detector placed in mutual opposition, whereby the test piece has on both sides concave and convex surfaces to which surface treatment have been applied. The first inspection detector has a coil wound in a convex shape for insertion into the concave surface so that the eddy current is excited in the concave surface of the test piece, and the second inspection detector has a coil wound in a concave shape to receive the convex surface so that the eddy current is excited in the convex surface of the test piece.

The surface property inspection apparatus of the present invention preferably further uses a technical means comprising a transport device configured to transport the test piece, whereby the transport device is constituted to transport the test piece to either the first inspection detector or the second inspection detector, and after inspection of a first inspection area, to transport the test piece to the other of either the first inspection detector or the second inspection detector, where inspection of a second inspection area on the opposite side of the first inspection area is performed.

In the invention thus constituted, test pieces are transported by a transport device to enable continuous inspection of different inspection areas with the first inspection detector and the second inspection detector, thus enabling efficient inspection. Also, because inspection is performed by affixing the inspection detector and transporting the test piece, the inspection detector installation environment can be stabilized, and a surface property inspection apparatus with higher accuracy inspection can be achieved.

BRIEF DESCRIPTION OF FIGURES

FIGS. 2A and 2B are explanatory drawings schematically showing that inspection of test pieces of differing dimensions is possible.

FIG. 8 is a flow chart showing a measurement value calibration method.

EMBODIMENTS OF THE INVENTION

Surface Property Inspection Apparatus

Figure 1:
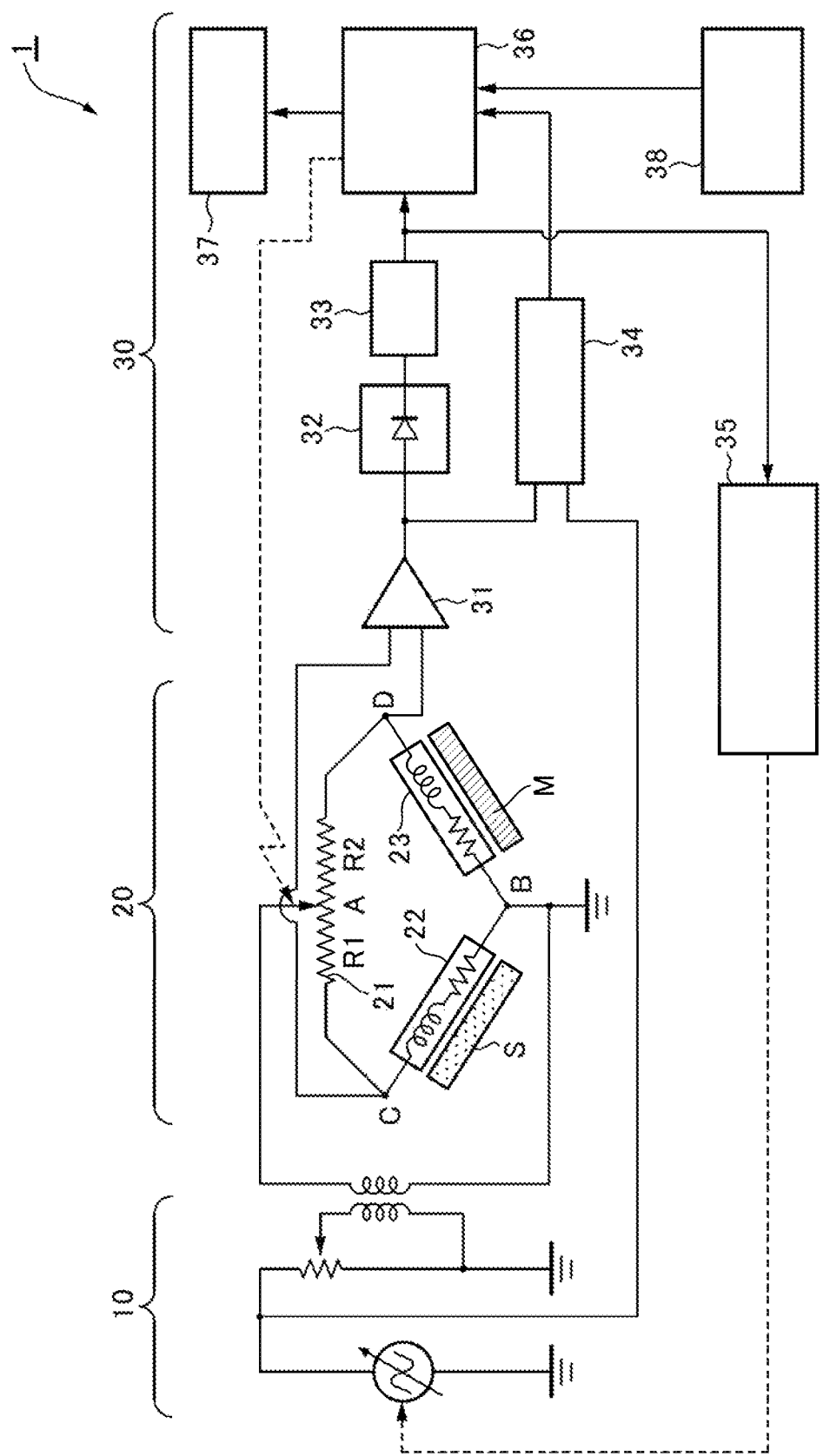
FIG. 1 is an explanatory drawing showing circuitry in a surface property inspection apparatus.

As shown in FIG. 1, surface property inspection apparatus 1 using the surface property inspection method of the invention comprises an AC bridge circuit 20 and an evaluation apparatus 30.

The AC power supply 10 is capable of supplying variable frequency AC power to the AC bridge circuit 20.

The AC bridge circuit 20 is formed to permit disposition of a variable resistor 21, an inspection detector 23 formed to permit placement of a coil so that an eddy current is excited in the test piece M, and a reference test piece S of the same structure as the test piece M but not surface-treated, and comprises a reference detector 22 for detecting a reference state serving as reference for comparison with the output from the inspection detector 23. Here the term "same structure as test piece M" means that material and shapes are the same.

The variable resistor 21 distributes a resistance RA into a resistor R1 and a resistor R2, and is constituted to be capable of variably distributing a distribution ratio γ. This distribution ratio γ indicates the distribution ratio between resistor R1 and resistor R2. Resistor R1 and resistor R2, together with reference detector 22 and inspection detector 23, constitute a bridge circuit. In the present embodiment, point A, which distributes resistances R1 and R2, and point B between reference detector 22 and inspection detector 23, are connected to the AC power supply 10 of the evaluation device 30, and point C between resistor R1 and reference detector 22, and point D between resistor R2 and inspection detector 23, are connected to the amplifier 31. To reduce noise, the reference detector 22 and inspection detector 23 side are grounded.

The evaluation device 30 is furnished with an amplifier 31 for amplifying the voltage signal output from the AC bridge circuit 20, an absolute value circuit 32 for rectifying all waveforms, a low-pass filter 33 (LPF) for DC conversion, a phase comparator 34 for comparing phases of the AC voltage supplied from the AC power supply 10 and the voltage output from the amplifier 31, a frequency adjustment device 35 for adjusting the frequency of the AC voltage supplied from the AC power supply 10, a judgment means 36 for making a good/bad judgment of the surface condition of the test piece M based on the output from the LPF 33, a display means 37 for displaying and giving warning of the judgment results by the judgment means 36, and a temperature measurement means 38 for detecting the temperature at an evaluation position. A memory means is also provided inside the judgment means 36 or in areas not shown in FIG. 1.

The amplifier 31 is connected to points C and D, and the potential difference between points C and D is input thereto. Absolute value circuit 32 and LPF 33 are connected in that order to the judgment means 36. Phase comparator 34 is compared to the AC power supply 10, amplifier 31, and judgment means 36. Frequency adjuster 35 is connected to the AC power supply 10 and amplifier 31. Judgment means 36, by outputting a control signal, can change the position of point A in the AC bridge circuit 20, i.e., can change the distribution ratio γ between the resistor R1 and resistor R2, thus executing the resistance ratio setting step described below.

The temperature measurement means 38 is made up of a non-contacting ultraviolet sensor, a thermocouple, or the like, and outputs a temperature signal for the test piece M surface to the judgment means 36. When the temperature of test piece M detected by temperature measurement means 38 is within a predetermined range, the judgment means 36 makes 3 good/bad judgment of the surface treatment state of test piece M. When the temperature detected by temperature measurement means 38 is outside a predetermined range, no good bad judgment is made of the surface treatment slate of test piece M. This enables high accuracy inspection to be performed, since good/bad judgment of the surface treatment state of test piece M is omitted when the temperature detected by the temperature measurement means affects the accuracy of the inspection. Here, a constitution may be adopted in which the temperature of evaluation position Ts is measured using a thermocouple or the like, and a judgment is made of the good/bad state of the surface treatment of test piece M using the surface temperature of test piece M as a representative temperature.

A detector capable of exciting an eddy current in the test piece M is used as the inspection detector 23 and the reference detector 22 of the same constitution as the inspection detector 23, whereby a coil is wound around the outer perimeter of a core into which the evaluation portion of a test piece M can be inserted, and the coil is placed in opposition to the test piece M surface and brought into proximity with same. That is, the coil is wound in opposition, so as to surround the surface property inspection area of the test piece. Here, "surround the test piece surface treatment inspection area" means the encapsulation of at least a portion of the surface treatment inspection area, and includes the excitation of an eddy current in the surface treatment inspection area.

As the test piece M, we explain an inspection detector 23 used to inspect the surface treatment of a test piece M having sloped surfaces Ma (the outer perimeter surface, being the outside convex surface) and Mb (the inner perimeter surface, being the inside concave surface), wherein said sloped surfaces Ma, Mb are respectively surface-treated. Note that the reference detector 22 has the same constitution as the inspection detector 23.

Figure 2A:
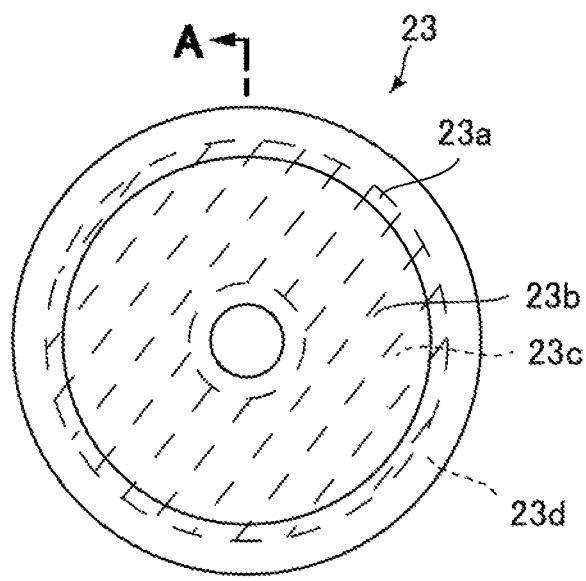
FIG. 2A is an explanatory drawing showing an example of an inspection detector constitution, being a plan view explanatory drawing of an inspection detector for inspecting a test piece with a sloped surface.
Figure 2B:
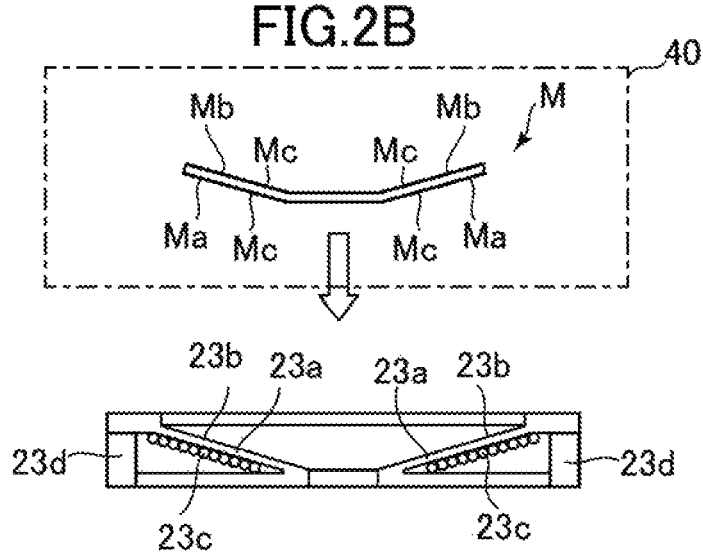
FIG. 2B is an explanatory drawing showing an example of the constitution of an inspection detector, being a section through A-A in FIG. 2.

As shown in FIGS. 2A and 2B, the inspection detector 23 comprises a bobbin 23a, open toward the top and having a sloped surface 23b (a conic surface being a downward-projecting convex wall surface) formed to oppose a surface-treated layer Mc applied to the sloped surface Ma on the outside of the test piece M, and a coil 23c wound on the outside perimeter surface side of the bobbin 23a sloped surface 23b. In the present embodiment, a resin cover 23d is installed to block off the coil 23c from the outside. This allows prevention of contact by iron filings or metal pieces with the coil 23c and prevention of damage by physical contact with the coil 23c.

The bobbin 23a is formed of a non-magnetic material such as resin. The coil 23c is placed on the outside of the bobbin 23a, and is wound into a concave shape for receiving the convex surface of the test piece M so as to excite an eddy current in the convex surface of the surface-treated test piece M (the sloped surface Ma on the outside of the test piece M). The bobbin 23a is constituted to receive the sloped surface Ma (convex surface) of the test piece on the inside perimeter surface of its sloped surface 23b (convex wall surface), exciting an eddy current in the sloped surface Ma.

Note that in the present embodiment the bobbin 23a sloped surface 23b (convex wall surface) is formed as a circular truncated cone, but depending on the shape of the test piece used, the sloped surface 23b may also be constituted as any desired convex wall surface, such as a cone, a pyramid, a truncated pyramid, a dome, or the like, and the coil conductor may be wound on the outside perimeter surface thereof.

To capture the eddy current reaction with high accuracy when evaluating surface properties, the inspection detector 23 is preferably arranged so that the coil 23c is disposed in close proximity with the surface of the test piece M, so that an eddy camera flows in the region where one wishes to inspect surface properties. That is, it is preferable to dispose the coil winding direction to be the same direction as the direction in which one wishes the eddy current to flow, and in the present embodiment it is wound along the sloped surface. When the test piece M is placed in close proximity to the inspection detector 23, the coil is wound so as to cover at least the area facing the surface-treated portion.

A coil is placed in opposition to the test piece M inspection objective surface and the inspection detector 23 is disposed. An AC magnetic field is generated when AC power at a predetermined frequency is supplied to the coil by the AC power supply 10, and an eddy current flowing in a direction crossing the AC magnetic field is excited on the test piece M surface. Since the eddy current changes according to electromagnetic properties of the surface treatment layer, the phase and amplitude (impedance) of the output waveform (surface treatment state) output from the amplifier 31 changes according to properties of the surface-treated layer Mc. This change in output waveform is what enables detection of the electromagnetic properties of the surface treatment layer Mc to perform inspection.

It was not possible in conventional inspection detectors to excite a sufficient eddy can in a test piece when inspecting a test piece M having sloped surfaces Ma, Mb, and since the output voltage from the AC bridge circuit drops, evaluation was difficult. In contrast, the inspection detector 23 of the present embodiment has a sloped surface 23b, therefore, by loading the test piece M on the bobbin 23a, the coil 23c can be placed in close proximity along the surface treatment layer Mc. A sufficient eddy current can thus be excited in the test piece M and the output voltage can be increased, matting it favorable for evaluation of test pieces M having sloped surface Ma, Mb.

Figure 2C:
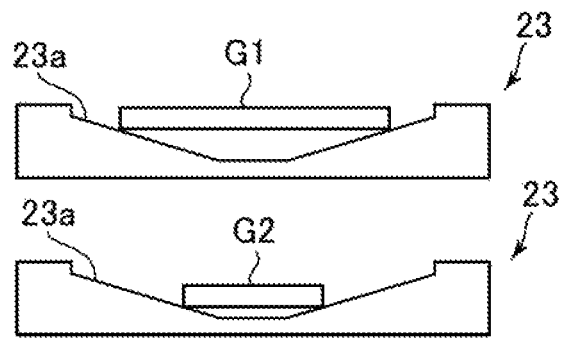
FIG. 2C is an explanatory drawing showing an example of the constitution of an inspection detector.

An inspection detector 23 having such a sloped surface 23b can also be used for evaluating test pieces M of differing dimensions. As shown in FIG. 2C, for example, when evaluating a large diameter gear G1 and a small diameter gear G2, the positions of the gears G1 and G2 can respectively be placed in a favorable position along a sloped surface. By so doing, test pieces M with a large number of part types and shapes can be evaluated using a single inspection detector 23.

The inspection detector 23 does not require the bobbin 23a so long as the shape of the coil 23c can be maintained. Such a coil 23c may be formed, for example, by adhesion of an enamel copper wire with an air core using a hardening epoxy resin or the like, or by winding around an air core using a heat-hardening fusing enamel copper wire, then hardening with heat from hot air or a drying oven.

It is also possible to install a magnetic shield, placed on the outside of the inspection detector 23 to surround the test piece M. External magnetism can be blocked off by using a magnetic shield to prevent a drop in magnetic property detection sensitivity, and to prevent mistaken inspections of test piece M surface properties.

Output from the AC Bridge Circuit

Figure 3:
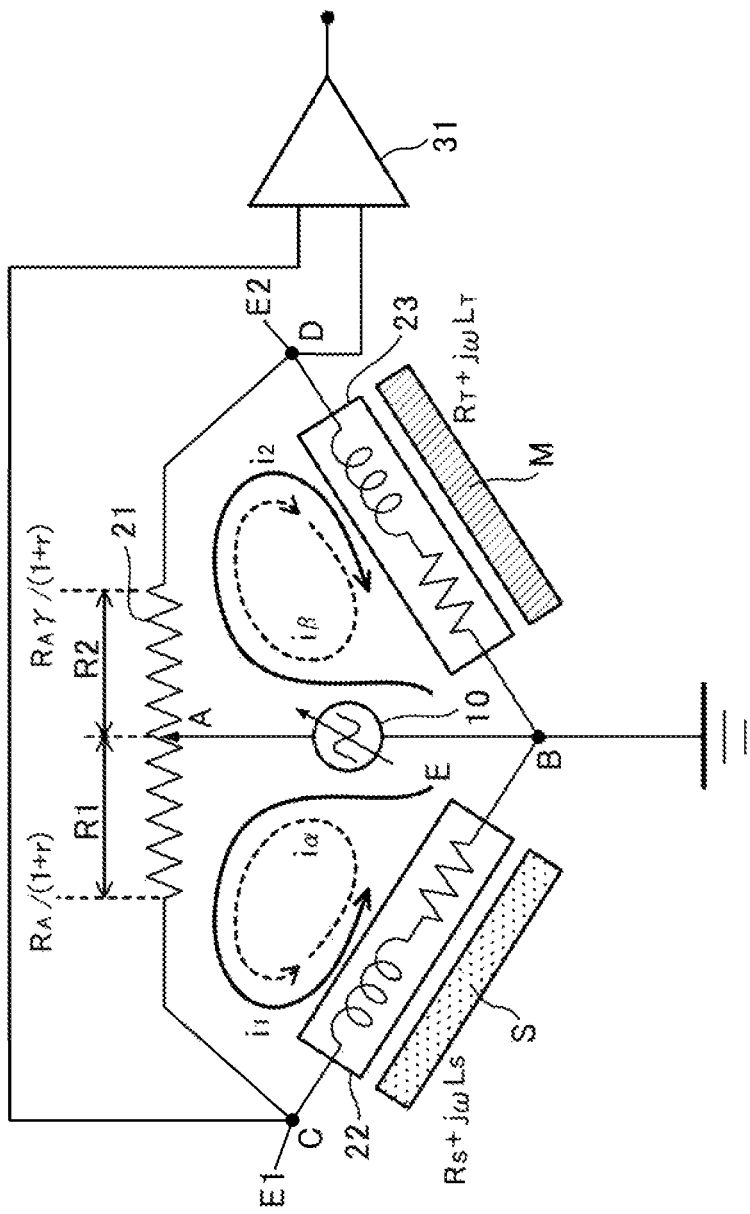
FIG. 3 is an equivalent circuit diagram explaining the output from an AC bridge circuit.

Next, referring to the FIG. 3 equivalent circuit, we discuss the output from the AC bridge circuit 20, adjusted to a non-equilibrium state. A reference test piece S for outputting a reference output is brought into close proximity with the reference detector 22, and a test piece M for which a surface property state good/bad determination is to be made is brought into close proximity with the inspection detector 23. Here the reference test piece S has the same structure as the test piece, and an untreated part to which no surface treatment has been applied is used.

When the variable resistor RA distribution ratio is $\gamma$, the resistor R1 is $R_A/(1+\gamma)$ and the resistor R2 is $R_A\gamma(1+\gamma)$. The reference detector 22 impedance is assumed to be $R_S+j\omega L_S$, and the impedance of the inspection detector 23 is assumed to be $R_T+j\omega L_T$. The potential at point A is deemed E excitation currents flowing on each side of the bridge when each test piece (reference test piece S, test piece M) is not brought into close proximity with the reference detector 22 and the inspection detector 23 are deemed i1 and i2. The amount of magnetism changes by bringing the test pieces into close proximity with the reference detector 22 and inspection detector 23, and the currents flowing in response to that change amount are deemed $i\alpha$ and $i\beta$. The potentials E1, E2 on the reference detector 22 and inspection detector 23 and the excitation currents i1, i2 at this time are expressed by Formulas (1)-(4) below.

Formula 1

$$E1 = (R_S + j\omega L_S)(i\alpha + i_1) \tag{1}$$

Formula 2

$$E2 = (R_T + j\omega L_T)(i\beta + i_2) \tag{2}$$

Formula 3

$$i_1 = \frac{E}{\frac{R_A}{1+\gamma} + R_S + j\omega L_S} \tag{3}$$

Formula 4

$$i_2 = \frac{E}{\frac{R_A\gamma}{1+\gamma} + R_T + j\omega L_T} \tag{4}$$

The voltage output on the amplifier 31 is the difference between E1 and E2, expressed by the following formula:

Formula 5

$$E2-E1=[\{(R_T+j\omega L_T)i\beta-(R_S+j\omega L_S)i\alpha\}+\{(R_T+j\omega L_T)i_2-(R_S+j\omega L_S)i_1\}] \tag{5}$$

The following formula is derived from Formulas (3) through (5);

Formula 6

$$E2 - E1 = \left[ \{(R_T + j\omega L_T)i\beta - (R_S + j\omega L_S)i\alpha\} + \right.$$
$$\left. \left\{ (R_T + j\omega L_T)\frac{E}{\frac{R_A\gamma}{1+\gamma} + R_T + j\omega L_T} - \right.\right.$$
$$\left.\left. (R_S + j\omega L_S)\frac{E}{\frac{R_A}{1+\gamma} + R_S + j\omega L_S} \right\} \right] \tag{6}$$

We divide the right side of Formula (6) into the following components A and B to consider each component of the differential voltage.

$(R_T + j\omega L_T)i\beta - (R_S + j\omega L_S)i\alpha$  Component A $(R_T + j\omega L_T)\dfrac{E}{\dfrac{R_A\gamma}{1+\gamma} + R_T + j\omega L_T} -$  Component B $(R_S + j\omega L_S)\dfrac{E}{\dfrac{R_A}{1+\gamma} + R_S + j\omega L_S}$ Component A consists of each of the detector components: $(R_S+j\omega L_S)$, $(R_T+j\omega L_T)$, and the amount of current change when each sample is brought into close proximity with each detector consists of $i\alpha$ and $i\beta$. The size of $i\alpha$ and $i\beta$ varies with the amount of magnetism passing through the test of due to electromagnetic properties such as magnetic permeability and electrical conductivity. For this reason, the size of $i\alpha$ and $i\beta$ can be changed by changing the excitation currents i1, i2 which control the amount of magnetism generated by each detector. According to Formulas (3) and (4), excitation currents i1, i2, change according to the variable resistor distribution ratio $\gamma$, therefore the size of component A can be changed by adjusting the Variable resistor distribution ratio $\gamma$.

Component B consists of each of the detector components: $(RS+j\omega LS)$, $(RT+j\omega LT)$, and the resistance parameter, divided by the variable resistor distribution ratio γ. Therefore the size of component B can be changed by adjusting the variable resistor distribution ration γ in the same way as component A.

When a test piece M is placed in a predetermined position and an AC current at a predetermined frequency is supplied to the inspection detector 23 coil 23c by the AC power supply 10, an eddy current flowing in a direction crossing the AC magnetic field on the test piece M surface is excited. Since eddy currents change in response to electromagnetic properties of the residual stress layer, phase and amplitude (impedance) of the output waveform output from amplifier 31 changes in response to properties of the residual stress layer (the surface treatment state). Electromagnetic properties of the residual stress layer can be detected using these changes in output waveform to perform an inspection of the sit face-treated layer.

Surface Property Inspection Method

Figure 4:
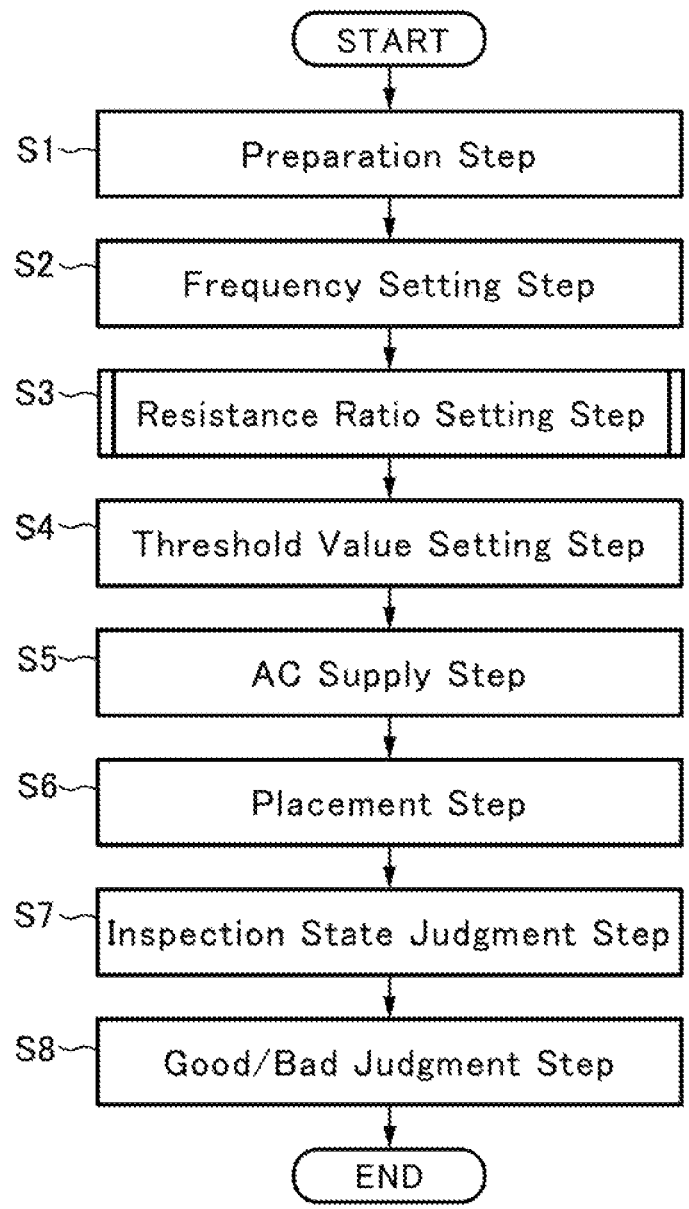
FIG. 4 is a flow chart showing a surface property inspection method.

Next, referring to FIG. 4, we discuss a method for inspecting the surface properties of a test piece using a surface property inspection device 1.

First, in preparatory step S1, a surface property inspection apparatus 1 and a reference test piece S are prepared as a surface property inspection preparation step.

The next frequency setting, step S2 sets a frequency corresponding to the penetration depth of the eddy current corresponding to the thickness of the test piece M surface treatment layer. In frequency setting step S2, with reference inspection object S brought into proximity with inspection detector 23 and a setting test piece, to which a surface treatment of the same structure the reference test piece S is applied, is brought into proximity with the inspection detector 23. AC power is supplied from the AC power supply 10 the AC bridge circuit 20, the frequency of AC power supplied to the AC bridge circuit 20 by the frequency adjuster 35 is varied, Land the voltage amplitude output from the AC bridge circuit 20 or the voltage output from LPF 33 are monitored.

The frequency adjustment device 35 outputs a control signal to the AC power supply 10 to establish an initial frequency f1 set in the frequency adjustment device 35, and the output voltage Ef1 from the amplifier 31 at frequency f1 is input to the frequency adjustment device 35 and stored.

Next, a control signal is output to the AC Power supply 10 so as to reach a frequency f2, higher than frequency f1 by a predetermined value, such as 100 Hz. An output voltage Ef2 from amplifier 31 at frequency f2 is input to the frequency adjuster 35 and stored.

Next, Ef1 and Ef2 are compared. If Ef2>Ef1, a control signal is output so that the frequency goes to f3, which is higher by a predetermined value than frequency f2, and an output voltage Ef3 output from the amplifier 31 at frequency f3 is input to the frequency adjustment device 35 and stored. Ef2 and Ef3 are then compared. This is, repeated and the frequency fn and output voltage are stored until Efn+1<Efn. Output voltages are stored with the reference test piece S and the surface treatment-applied setting test piece of the same structure as the reference test piece S respectively brought into proximity with the inspection detector 23, and the absolute value of the differential output voltages for each frequency is calculated for the situation in which the reference test piece S and the setting test piece are brought into proximity with the inspection detector 23.

From the calculated result, the frequency at which the differential value is maximal is selected and set as the frequency used in the threshold setting step S4 and the AC supply step S5. This enables setting of a frequency with a one-time manipulation to cause the output from the AC bridge circuit 20 to increase in response to test pieces M with differing surface treatment states, shapes, and impedances. Thus the output is able to respond sensitively to changes in surface treatment state, improving inspection sensitivity.

Note that the variable resistor setting step S2 can be implemented without using a reference test piece S. Also, optimal frequency may vary with test piece material, shape, and surface treatment state, but when these are known in advance, frequency setting is unnecessary.

Figure 5:
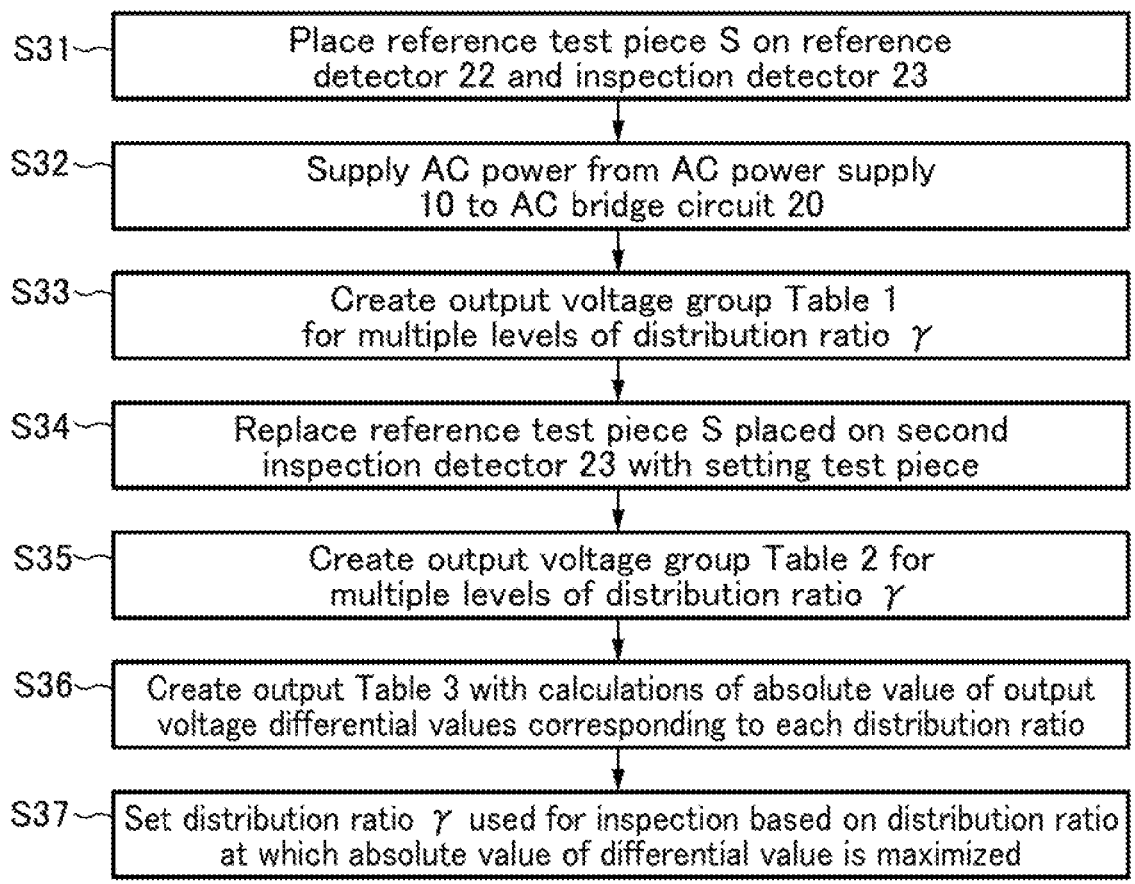
FIG. 5 is a flow chart showing a resistance ratio setting step.

Next, a resistance ratio setting step S3 is performed. In the resistance ratio setting step S3, the distribution ratio γ of Variable resistor 21 is set so that surface property inspection apparatus 1 test piece detection sensitivity increases. Details of the resistance ratio setting step S3 are shown in FIG. 5.

First, in step S31, the reference test piece S is disposed on the reference detector 22 and the inspection detector 23.

In the following step S32. AC power is supplied from the AC power supply 10 to the AC bridge circuit 20.

In the next step S33, the variable resistor 21 distribution ratio γ is set at multiple levels. An output voltage is measured at each level, and a Table 1 of a group of output voltages is created and stored in the evaluation apparatus 30.

For example, n distribution ratios are set and, as shown in Table 1, a Table 1 is created indicating the corresponding output voltages. This set of output voltages corresponds to "first setting output voltage signals," and steps S31-S33 above correspond to the first signal acquisition step for acquiring the "first setting output voltage signals."

TABLE 1

| DISTRIBUTION RATIO | γ1 | γ2 | ... | γ(n − 1) | γn |
|---|---|---|---|---|---|
| OUTPUT VOLTAGE | X1 | X2 | ... | X(n − 1) | Xn |

In the next step S34, the reference test piece S disposed on the inspection detector is exchanged fora surface-treated setting test piece of the same structure as the reference test piece S. That is, the reference test piece S is placed on the reference detector 22, and a setting test piece is placed on the inspection detector 23.

In the next step S35, an output voltage is measured for each distribution ratio level set in step S33, and an output voltage group Table 2 is created and stored. This output voltage group corresponds to "second setting output voltage signals," and steps S33-S35 above correspond to a second signal acquisition step for acquiring the "second setting output voltage signals."

TABLE 2

| DISTRIBUTION RATIO | γ1 | γ2 | ... | γ(n − 1) | γn |
|---|---|---|---|---|---|
| OUTPUT VOLTAGE | Y1 | Y2 | ... | Y(n − 1) | Yn |

In the next step S36, a Table 3 with the absolute value of differential values corresponding to, the distribution ratio of each bridge circuit is created and stored using Table 1 and Table 2.

TABLE 3

| DISTRIBUTION RATIO | γ1 | γ2 | ... | γ(n − 1) | γn |
|---|---|---|---|---|---|
| DIFFERENCE VALUE | \|X1 − Y1\| | \|X2 − Y2\| | ... | \|X(n − 1) − Y(n − 1)\| | \|Xn − Yn\| |

In step S37, as a resistance ratio determining step, the resistance ratio used to inspect test pieces is determined based on the "first setting output signal" and the "second setting output signal." That is, the distribution ratio at which the absolute value |X−Y| of the difference between the first setting output signal X and the second setting output signal Y is maximized relative to the same distribution ratio (resistance ratio) obtained as shown in Table 3 is determined as the distribution ratio set for inspecting the test piece. Thus by determining a distribution ratio based on the relationship between the first setting output signal and the second setting output signal, a distribution ratio at which the output signal from the AC bridge circuit increases can be reliably selected. For example, a distribution ratio can be selected and set based on the ratio X/Y of a first setting output signal X and a second setting output signal Y relative to the same distribution ratio.

If the distribution ratio γ is set without bringing the reference test piece S into proximity with tire reference detector 22 and the inspection detector 23, the difference in properties between the reference detector 22 and the inspection detector 23 is reduced, but because the reference test piece S and test piece M are brought into proximity during inspection, changes occur in the coil distribution amounts, resulting in changes in output voltage phase and a drop in detection sensitivity. However, by setting the variable resistor 21 using the above-described distribution ratio γ setting method, the effects of changes in output voltage phase can be removed, and a distribution ratio γ appropriate to inspection can be set. The difference can thus be increased between the case in which the surface treatment state of a test piece M brought into proximity with inspection detector 23 is poor, vs. the case when the surface treatment state is good, thereby allowing detection accuracy to be raised. This can be favorably used on test pieces M with high void ratios, such as large diameter wound springs or valve springs. In inspections of test pieces M having a sloped surface, such as plate springs or diaphragms, where the shape or size of the inspection detector 23 varies, the distributed capacitance of the coil changes, therefore effects from changes in output voltage phase can be eliminated, and the apparatus can be favorably utilized.

In resistance ratio setting step S3, a resistance ratio is selected at which, using a test piece M, the output voltage differential between surface treatment and no surface treatment is increased, therefore a frequency corresponding to the eddy current penetration depth must first be set according to the thickness of the surface treatment layer of the test piece M. The distribution ratio γ is one cause of output voltage phase change, therefore when the resistance ratio setting step S3 is performed before the frequency setting step S2, the output voltage difference between having and not having surface treatment on the test piece M is not increased. All that happens is that the voltage differential due to the resistance ratio determined by the distribution ratio γ is increased. Because there is a possibility that the difference in output voltages due to surface treatment cannot be increased, the resistance ratio setting step S3 is performed after the frequency setting step S2.

Figure 6:
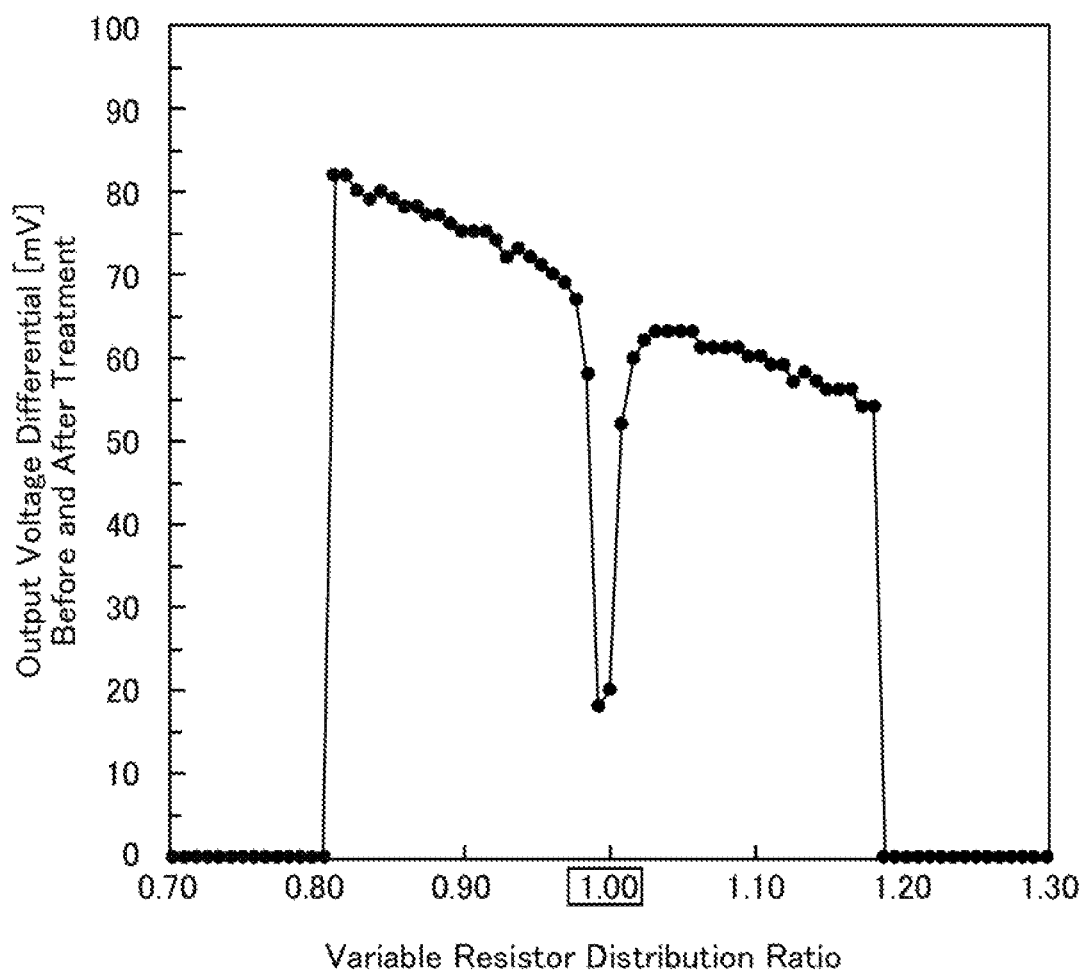
FIG. 6 is an explanatory drawing showing the relationship between distribution ratio and output voltage differential value to explain the distribution ratio setting method in the resistance ratio setting step.

An example of resistance ratio setting step S3 is shown. An untreated spring (φ25×60 mm) was used as a reference test piece, and a spring (φ25×60 mm) subjected to shot-peening was used as a setting test piece. FIG. 6 graphically illustrates the Table 3 created in step S36. The vertical axis shows the differential value, and the horizontal axis shows the variable resistor distribution ratio. Here, due to limitations on the rated voltage of the AC bridge circuit, the distribution ratio is varied between 0.80-1.20.

When the distribution ratio is 1.00, the resistance ratio of the variable resistor is 1:1, and the circuit output reflects a state in which electrical properties of the reference detector and inspection detector constituting the AC bridge circuit are canceled. When the distribution ratio differs from 1.00, the variable resistor distribution ratio skews in one direction, and the AC bridge circuit is in a non-equilibrium state. It can be seen from FIG. 6 that the output voltage differential can be increased by skewing the variable resistor distribution ratio γ toward 1 or below.

By setting the distribution ratio γ at 0.80, at which the differential value is maximal, a large output voltage differential of 80 mV can be obtained, improving inspection accuracy. Here, for circuit protection, a distribution ratio γ corresponding to 85-95% of the maximum differential value can be set.

The threshold value used to judge a good or bad surface state of the test piece M is set in the threshold setting step S4. Here we explain a method for setting a threshold value which is pre-set for use at the start of evaluation of the test piece M (the "initial threshold value" below). First, the reference test piece S is brought into proximity with the reference detector 22, and AC power at the frequency set in frequency setting step S3 is supplied from the AC power supply 10 to the AC bridge circuit 20. The voltage output from the AC bridge circuit 20 is amplified by the amplifier 31. A full wave rectification is performed in the absolute value circuit 32, a DC conversion is performed in the LPF 33, and the result is output to the judgment means 36. Approximately 10 to several 10s of non-treated test pieces and surface-treated test pieces with good surface states are respectively prepared, and output value distribution data is acquired from output values output to the judgment means 36 when the respective test pieces are brought into proximity with the inspection detector 23. This is shown schematically in FIG. 7.

The initial threshold value Ethi is determined by the following formula, based on the output signal EA when an untreated test piece M is placed on the inspection detector 23, and on the output signal EB when a surface-treated test piece M with a good surface state is placed on the inspection detector 23, with allowance made for variability in the respective output signals.

Figure 7:
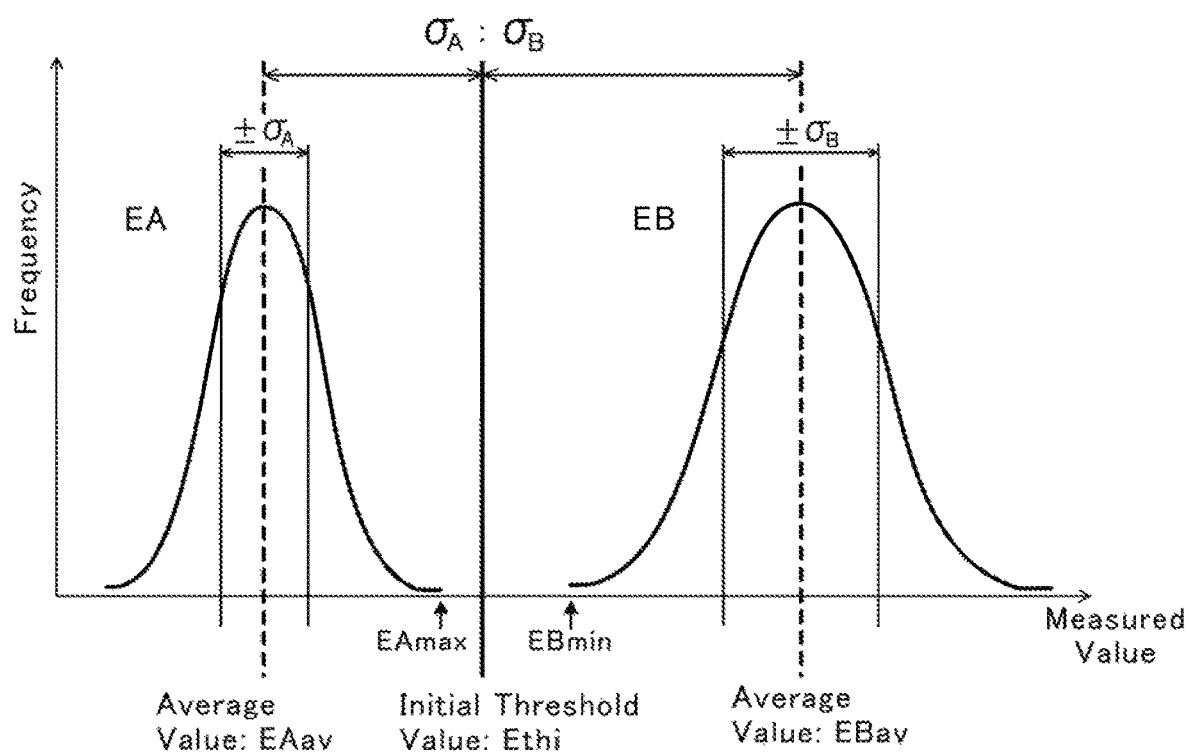
FIG. 7 is an explanatory drawing explaining an initial threshold value setting method.

FIG. 7 schematically shows the distribution of output signals EA from an untreated test piece and output signals EB from a surface-treated test piece.

$$Ethi=(EAav \cdot \sigma B+EBav \cdot \sigma A)/(\sigma A+\sigma B) \quad \text{(Formula 7)}$$

Eav: average value of output signal EA; EBav: average value of output signal EB; σA; output signal EA standard deviation; σB: output signal EB standard deviation A high accuracy appropriate threshold value can by this means be set using a small number of measurements. This initial threshold value Ethi is set as the threshold value and stored in the judgment means 36. Here the initial threshold value Ethi has the relationship EAmax<Ethi<EBmin between the output signal EA maximum value EAmax and the output signal EB minimum value EBmin. Even when the aforementioned relationship does not obtain, an appropriate initial threshold value Ethi, can be set, taking into account matters such as variability of the output signal EA and output signal EB, and whether there are exceptional measurement values significantly outside the distribution.

For example, there are methods such as taking multiple measurements of the same test piece in an untreated and in a surface-treated state, then using these to recalculate the initial threshold value Ethi.

In addition, in threshold value setting step S4, the output signal when the test piece M is not brought into proximity with the inspection detector 23 can be stored in the judgment means 36 as initial offset value Ei.

In AC supply step S5, AC power at the frequency set in frequency setting step S3 is supplied from the AC Power supply 10 to the AC bridge circuit 20. Here, the reference test piece S is brought into proximity with the reference detector 22.

Next, in placement step S6, the test piece M for which a surface treatment state good/bad determination is to be made is brought into proximity with the inspection detector 23, and is placed in such a way that an eddy current is excited in the test piece M. At this point, a voltage output signal is output from the AC bridge circuit 20. The output signal is amplified by the amplifier 31, full-wave rectified by the absolute value circuit 32, and converted to DC by the LPF 33. The output signal converted to DC in the LPF 33 is acquired by the judgment means 36 in a detection signal acquisition step.

The temperature measurement means 38 measures the surface temperature of the test piece M before the test piece M is brought into proximity with the inspection detector 23 or after placement of the test piece M, and outputs a test piece M surface temperature signal to the judgment means 36.

In the inspection state judgment step S7, the waveform of the AC power supplied from the AC power supply 10 and the AC voltage waveform output from the AC bridge circuit 20 are compared by the phase comparator 34, and a phase difference between them is detected. By monitoring this, phase difference, a good/bad judgment can be made of the test state (e.g., no positional offset between inspection detector 23 and test piece M). Even if outputs from AC bridge circuits 20 are the same, when the phase difference varies greatly there is a change in test state, and a judgment can be made the test may not be being correctly implemented. In addition, when the temperature of test piece M detected by the temperature measurement means 38 is within a predetermined range, the judgment means 36 makes a good/bad judgment of the surface treatment state of test piece M. When the temperature detected by the temperature measurement means 38 is outside a predetermined range, no good/bad judgment is made of the surface treatment state of test piece M. Here the predetermined temperature range is a temperature range over which temperature changes in test piece M do not substantially affect the test. They can be set, for example to 0~60° C. Various responses can be made if the temperature of the surface of test piece M is outside a predetermined temperature range, such as standing by until the test piece M falls within a predetermined temperature range, or blowing air onto the test piece M, or moving the test piece M to a different, line without testing it.

In the good/bad judgment step S8, the judgment means 36 judges the good/bad surface state of test piece M based on a signal converted to DC in the LPF 33 and input to the judgment means 36. That is, this is an evaluation step for evaluating surface properties of the test piece M based on output signals output from the AC bridge circuit 20. The judgment results by judgment means 36 are displayed by display means 37, and if the surface state is bad, a warning is issued.

The good/bad judgment of the surface treatment condition of the test piece M is made by comparing the output value (measurement value) from the LPF 33 with the threshold values set in threshold setting step S4. When the output value (measurement value) from the LPF 33 exceeds the threshold value, the judgment means 36 judges that the surface state is good. When the output value from the LPF 33 is at or below the threshold value, it judges that the surface state is bad.

Inspection data such as measurement values, good/bad judgment results, date of measurement, inspection state (temperature, humidity, differential voltage $\Delta E$ etc.) can be associated with test piece M identifying information such as lot, serial number, history, etc. and stored in the evaluation apparatus 30 judgment means 36 or other memory means and called as needed. That is, it is also possible for identifying indications associated with respective measurement data to be directly or indirectly attached to the test piece. For example, it is acceptable to directly or indirectly display barcodes or manufacturing control numbers associated with measurement data on the test piece. Thus by associating measurement data with identifying indications such as barcodes, product control numbers, or the like, the state of the test piece inspected by a surface property inspection apparatus can be traced after being distributed, and the traceability can be assured.

The steps above enable a simple and highly accurate inspection of whether the surface treatment condition of the test piece M is good or bad. To continue the test, it is sufficient to exchange only the test piece M and repeat disposition step S6, test state judgment step S7, and good/bad judgment step S8. If the type of test piece M or the surface treatment, etc., are changed, variable resistor setting step S2, frequency setting step S3 and threshold setting: step S4 are repeated.

The inspection detector 23, be capturing changes in the eddy current flowing on the surface of the test piece M, indirectly captures changes in surface resistance. Here, if shot peening is performed as the surface treatment, eddy current flow changes could occur due to shot peening-induced deformation, structural refinement, or dislocation, but at the level of temperature changes in the measurement environment (0° C.~40° C.), these are essentially constant. Magnetic changes detected by the detector 23 are caused by changes in the demagnetized field of eddy current flow, and since the causes for eddy current changes are not very susceptible to the effects of temperature changes in the measurement environment, the effects of temperature changes on inspection accuracy can be reduced.

Because a reference test piece S of the same structure as the test piece M is used to detect a reference state in the reference detector 22, fluctuations in output values caused by inspection environment changes in temperature, humidity, and magnetism, etc., will be the same on the reference detector as on the test piece M. Fluctuations in output values due to changes in the inspection environment such as temperature or humidity can thus be canceled and measurement accuracy improved. In particular, when an untreated part with no surface treatment applied is used as the reference test piece S, the output can be increased based on test piece M surface state differences, therefore measurement accuracy can be still further improved and the threshold values more easily set, which is preferable.

Threshold Value Update Setting

If there, is a large difference between the output signal EA when an untreated test piece M is placed on the inspection detector 23 and the output signal EB when a surface-treated test piece H with a good surface state is placed on the inspection detector 23, the initial threshold value Ethi may approach the output signal EA average value EAav, increasing the range of outputs deemed as good parts. Therefore if a still more accurate threshold value setting is desired, the threshold value can be newly set based on a large amount of inspection data accumulated by repeated measurements using initial threshold value Ethi.

The newly set threshold value in this instance is referred to as updated threshold value Ethn.

Setting of the updated threshold value Ethn is performed after inspecting 100 or more test pieces M, for example. An example of the method for setting an updated threshold value Ethn is shown below. Here the output signal from a test piece M inspected using an initial threshold value Ethi shall be EC. The minimum value thereof shall be ECmin, the maximum value ECmax, the average value ECav, and the standard deviation $\sigma C$.

In one method, the initial threshold value Ethi and minimum value ECmin are compared, and the updated threshold value Ethn calculated as follows.

If ECmin≤Ethi, the initial threshold value Ethi, is used without setting the updated threshold value Ethn.

If ECmin>Ethi, ECmin can be set as the updated threshold value Ethn.

It is also possible, by using the average value ECav and the standard deviation $\sigma C$, to adopt ECav−3$\sigma C$ or ECav−4$\sigma C$ as the updated threshold value Ethn. Which of ECav−3$\sigma C$ ECav−4$\sigma C$ to use should be judged with consideration for the distribution of the output signal EC. If ECav−3$\sigma C$ or ECav−4$\sigma C$ is equal to or less than initial threshold value Ethi, the initial threshold value Ethi is used, and no updated threshold value Ethn is set.

The updated threshold value Ethn can also be set based on the relative sizes of the minimum value ECmin, maximum value ECmax, and average value ECav. Specifically, cases are distinguished by comparing the average value of minimum value ECmin and maximum value ECmax (ECmin+ ECmax)/2 with the average value ECav.

If (ECmin+ECmax)/2≤ECav: set ECav−3$\sigma C$ as the updated threshold value Ethn.

If (ECmin+ECmax)/2>ECav: set ECav−4$\sigma C$ as the updated threshold value Ethn.

Here, if ECav−3$\sigma C$ or ECav−4$\sigma C$ is equal to or less than the initial threshold value Ethi, the initial threshold value Ethi is used without setting an updated threshold value Ethn.

The updated threshold value Ethn can be repeatedly updated based on inspection data for test pieces M inspected after an update. For example, 100 test pieces M could be inspected after setting the initial threshold value Ethi, then a further 100 test pieces M inspected after setting the updated threshold value Ethn, then a new updated threshold value Ethn set based on that inspection data. A new updated threshold value Ethn could also be set using inspection data for all 200 units.

Measurement Calibration

Measurements can be calibrated using the aforementioned initial offset value Ei and inspection offset value Eik.

As shown in FIG. 8, in step S101 the inspection offset value Eik measured and stored in the judgment means 36 before placement of a test piece M in step S6.

In step S102 which follows, the initial offset value Ei and the inspection offset value Eik are compared and a differential voltage $\Delta E = Ei - Eik$ is calculated. Step S102 and beyond correspond to the good/bad judgment step S8.

Inspection of the test piece M is performed in step S103, and a measurement value (E2−E1) is stored in step S104. A differential voltage $\Delta E$ is added to the stored measurement value in step S105.

In step S106, the measurement value to which the differential voltage $\Delta E$ is added is compared to a threshold value to make a good/bad judgment.

Thus even if offset voltage changes due to changes in the measurement environment such as temperature, humidity, or magnetism, a high accuracy measurement can be made with those effects removed. That is, an appropriate, high accuracy measurement can be made with calibration of the measurement instrument (inspection apparatus) conducted each time.

If the differential voltage $\Delta E$ exceeds an allowable value set based on surface property inspection device 1 usage conditions, a judgment can be made that the inspection state is inappropriate due to large external disturbances, apparatus failures, or the like, suggesting that inspection may not be being appropriately performed. If so, it is possible not to inspect the surface properties of the test piece M in the inspection state judgment step S7. On such occasions the reference detector 22 and inspection detector 23 may be checked, the temperature of the measurement environment confirmed, the reference test piece S checked or replaced, etc. Said allowable values can be set as conditions for appropriate performance of an inspection, e.g., as 5% of the initial offset value Ei ($\Delta E = 0.05\ Ei$).

Members having sloped surfaces such as plate springs are often surface-treated on the outer perimeter surface and inner perimeter surface sides of the sloped surface. Below we show the constitution of a favorable surface property inspection apparatus when evaluating such test pieces.

Such surface property inspection apparatuses further comprise a transport means 40.

The inspection detector in this surface property inspection apparatus is made up of a first inspection detector and a second inspection detector, respectively having sloped surfaces corresponding to the sloped surfaces Ma, Mb of the test piece M, and these first and second inspection detectors are placed in opposition in the vertical direction. The first inspection detector, placed below, is the inspection detector 23, constituted as shown in FIGS. 2A and 2B, for evaluating the inspection area on the outer perimeter surface side (outside convex surface) of the plate spring, and the second inspection detector, placed above, is for evaluating the inspection area on the inside perimeter surface side (inside concave surface) of the plate spring.

Figure 9A:
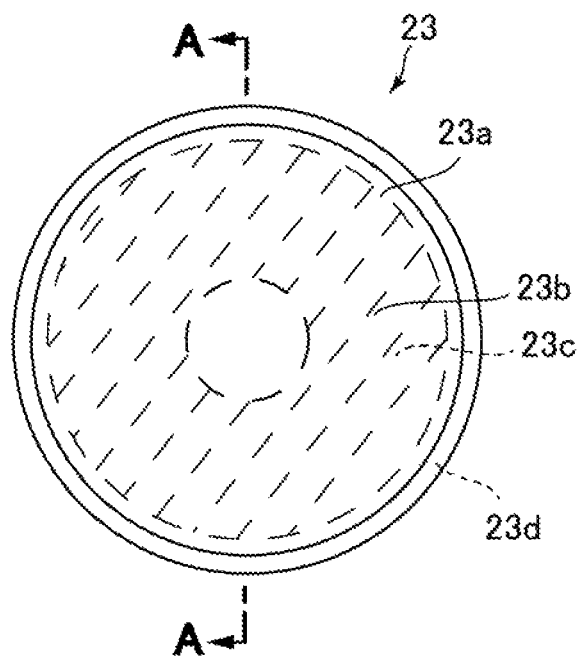
FIG. 9A is an explanatory drawing showing the constitution of a second inspection detector disposed above on a surface property inspection apparatus, being a perspective view explanatory drawing seen from below.
Figure 9B:
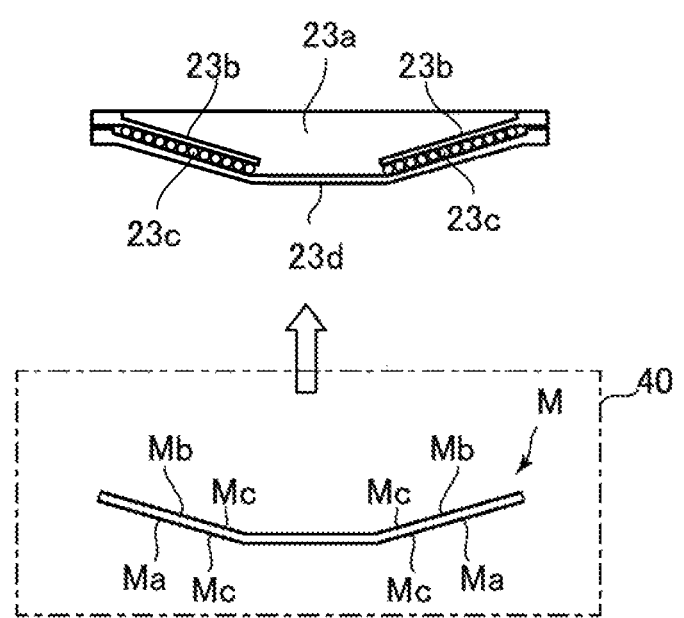
FIG. 9B is an explanatory drawing showing the constitution of a second inspection detector disposed above on a surface property inspection apparatus, being an explanatory drawing showing a section through A-A in FIG. 9A.

The constitution of the inspection detector placed above is shown in FIGS. 9A and 9B. The second inspection detector 23, placed above, has a downward facing shallow convex truncated cone-shaped bobbin 23a, and a coil 23c is wound onto the outside perimeter surface of this bobbin 23a sloped surface 23b (a conic surface, being a convex wall surface projecting downward) of this bobbin 23a. Thus the inspection detector 23 coil 23c is wound in a convex shape penetrating a concave surface, so as to excite an eddy current in the concave surface (sloped surface Mb) of the test piece M. In the present embodiment, a downward oriented convex resin cover 23d covers the coil 23c on the bottom side of the coil 23c, so that the coil 23c does not directly contact the test piece M. This convex Cover 23d covers the wound coil 23c conductors, and is inserted on the inside of the surface-treated sloped surface Mb (concave surface) so as to excite an eddy current in the sloped surface Mb (concave surface) of a surface-treated test piece. By covering the bottom surface of the coil 23c with a resin cover 23d, contact between the test piece and the coil resulting in damage such as coil wire breaks when the test piece is placed on the second inspection detector 23 can be prevented. Because the cover 23d is made of resin, eddy current excited in the test piece by the coil 23c is barely weakened, and there is almost no reduction in detection sensitivity.

That is, in the second inspection detector 23 of the present embodiment, the coil 23c is wound in a convex shape, so that bringing the test piece M into proximity with the bottom side of the cover 23d enables the coil 23c to be placed in close proximity along the surface-treated layer Mc. A sufficient eddy current can thus be excited in a test piece M, and output voltage can be increased, making the invention favorable for evaluation of test pieces M having a sloped surface Mb.

The transport means 40 consists of a belt conveyor, robot arm, or other known transport apparatus, and is capable of delivering test pieces M to and from a surface property inspection apparatus, and of placing test pieces M on an inspection detector.

In the inspection method, as a first transport step, the test piece M is first transported by the transport means 40 between the first inspection detector (FIGS. 2A, 2B) and the second inspection detector (FIGS. 9A, 9B) of the surface property inspection apparatus, then placed on the lower first inspection detector (FIGS. 2A, 2B). A horizon transport apparatus such as transport loader may be used as a transport means for transporting the test piece M in the horizontal direction between the first inspection detector and the second inspect detector (FIGS. 9A, 9B). The test piece M can also be lowered in the vertical direction, and a vertical transport means such as a cylinder used as a transport means for placing it on the first inspection detector. When so doing, loading the test piece M on a bobbin results in placement of the surface-treated side Mc (first inspection area) on the outside perimeter surface Ma side to be evaluated so that it follows the inside of the coil 23c.

The test piece M is stopped for 3 seconds, having been placed on the first inspection detector by be transport means 40. During this interval, as a first signal acquisition step, an AC power at a predetermined frequency is supplied by the AC power supply 10 to the first inspection detector coil 23c, an eddy current is excited in the test piece M sloped surface Ma, and an output signal is acquired from the AC bridge circuit 20. After evaluation of the surface-treated layer Mc on the outer perimeter surface Ma side by the lower first inspection detector (FIGS. 2A, 2B) ends, a second transport step is performed in which the test piece M is raised vertically by cylinder or other transport means, and the test piece M is transported to and placed on the second inspection detector (FIGS. 9A, 9B). At this point, by bringing the inside perimeter surface Mb of the test piece M into contact with the bottom surface (outer perimeter surface) of the cover 23d, the surface-treated layer Mc (second inspection area) on the inside perimeter surface Mb being evaluated is placed along the bottom surface (outer perimeter surface) of the second inspection detector 23 coil 23c.

Next, the test piece M is stopped for 3 seconds, having been placed the second inspection detector by the transport means 40. During this interval, as a second signal acquisition step, an AC power at a predetermined frequency is supplied by the AC power supply 10 to the second inspection detector coil 23c, an eddy current is excited in the test piece M sloped surface Mb, and an output signal is acquired from the AC bridge circuit 20. After evaluation of the surface treatment area on the inside perimeter surface Mb of the test piece M by the second inspection detector has ended, the test piece M is transported in the horizontal direction by a transport means such as a transport loader and discharged from the surface property inspection apparatus.

In the surface property inspection apparatus thus constituted, the test piece M is transported by a transport means, and the surface-treated layer Mc of the outer perimeter surface Ma and inside perimeter surface Mb can be continuously inspected, thus enabling efficient inspection. Also, performing inspections by affixing the first and second inspection detectors 23 and transporting the test piece M stabilizes the setting environment of each inspection detector 23, and a higher accuracy inspection can be achieved. Note that it is desirable to use an inspection device of the same shape as the first inspection detector (FIGS. 2A, 2B) as the reference detector 22 when executing an inspection with the first inspection detector, and to use an inspection device of the same shape as the second inspection detector (FIGS. 9A, 9B) as the reference detector 22 when executing an inspection with the second inspection detector.

Which of the first or second inspection detectors 23 shown in FIGS. 2A, 2B and FIGS. 9A, 9B is placed on top and which on the bottom is optional. It is also optional as to whether the inspection detectors placed on top or the inspection detector placed on the bottom is used first.

Control of Test Piece Placement and Removal

Figure 10A:
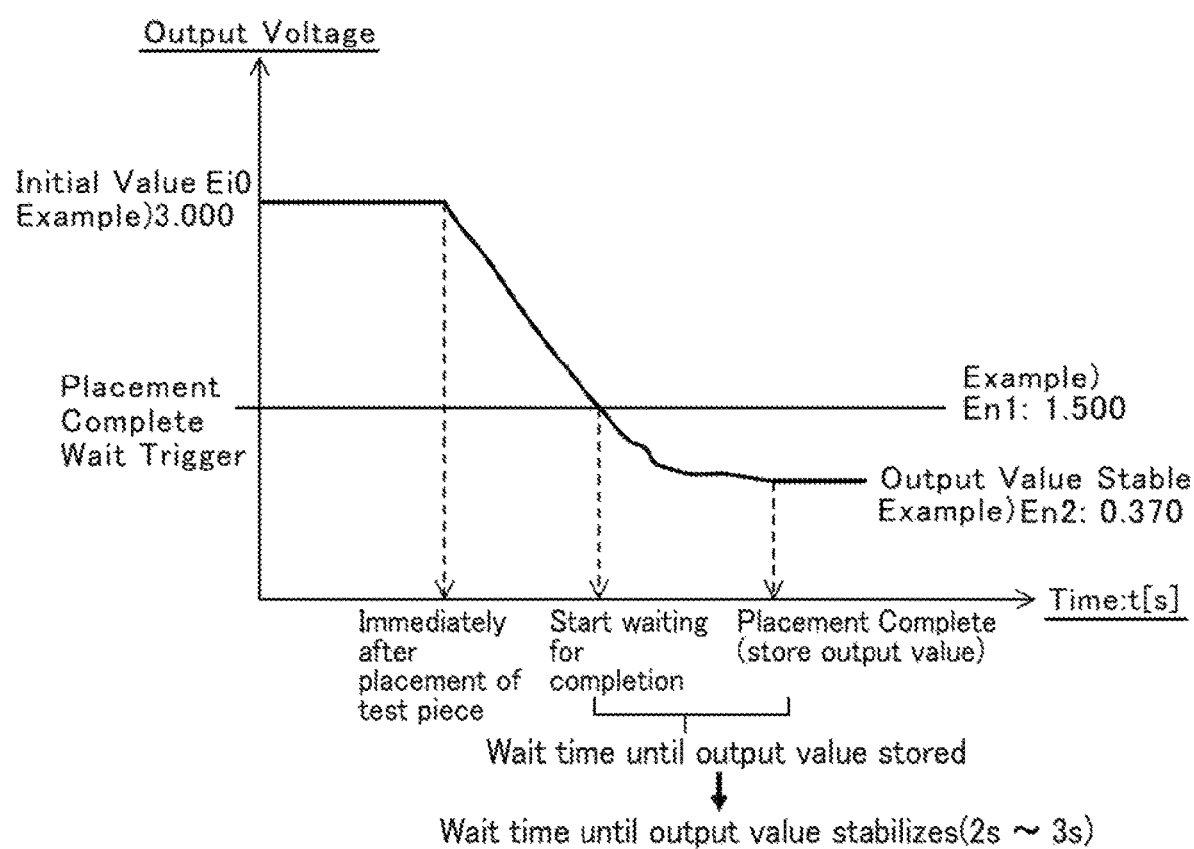
FIG. 10A is an explanatory drawing showing changes in output values from placement of a test piece until start of measurement.
Figure 10B:
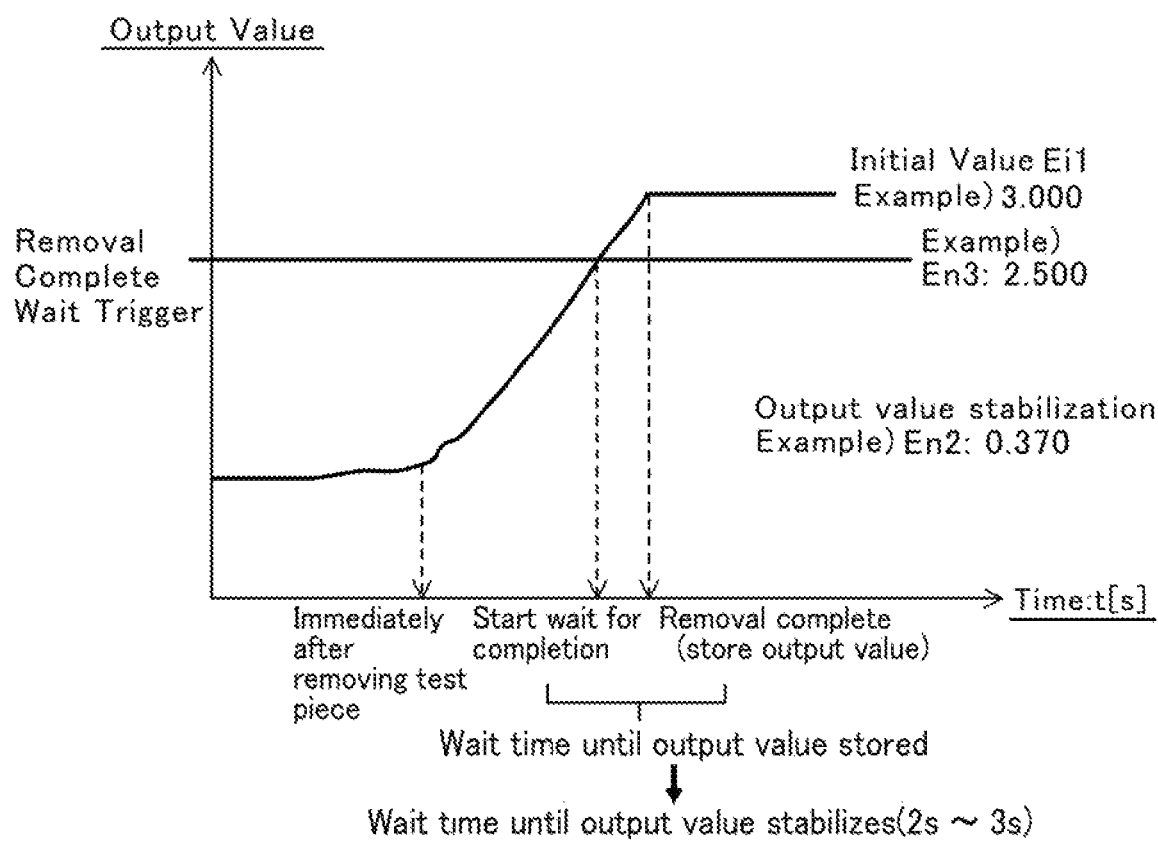
FIG. 10B is an explanatory drawing showing changes in output values from end of measurement until removal of the test piece.

The placement of the test piece M in and removal from the inspection detector 23 can be controlled using, the measurement value En (En=E2−E1). Referring to FIGS. 10A, 10B and FIGS. 11A, 11B, we explain a method for controlling placement and removal of a test piece. Note that FIGS. 10A, 10B show an example to explain the initial value Ei0 and output value En, etc. These are shown schematically, so are not actual output values.

Figure 11A:
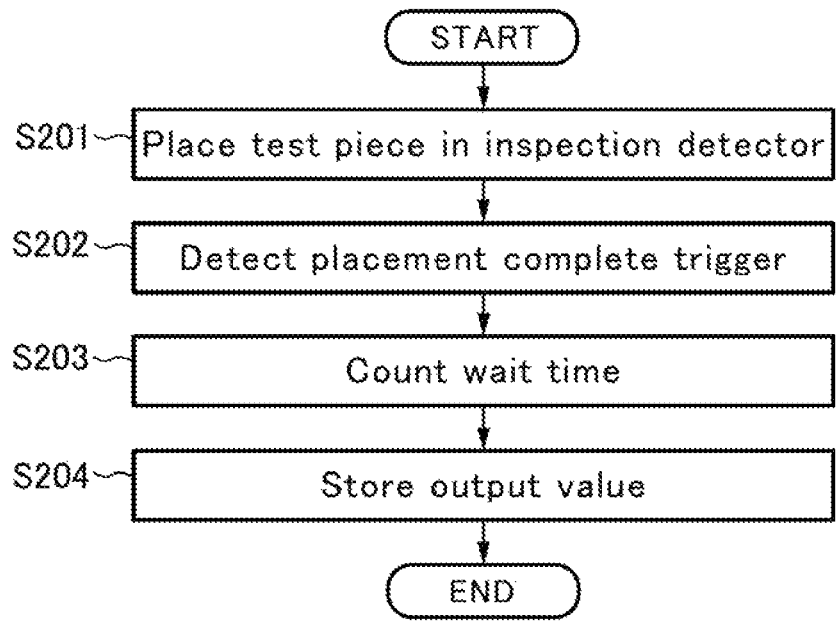
FIG. 11A is a flow chart showing steps from placement of the test piece until start of measurement.

First, when a test piece M is placed on the inspection detector 23 in step S201 shown in FIG. 11A, the output value begins to decline starting front the initial value of Ei0=3.000 obtained when no test piece M is placed, as shown in FIG. 10A.

Next, in step S202, placement of the test piece M in the inspection detector 23 is detected, and a trigger is detected for the criterion to start counting the time to start recording output values (start of the wait for measurement in FIG. 10A). In FIG. 10A, the time at which the output value reaches 1.500 is deemed to be the placement complete wait trigger En1, which counts waiting time in step S203. Note that the output value (1.500) serving as the placement complete wait trigger En1 is set by reverse calculation, so that the output value is stable when a predetermined time has elapsed as explained in the following paragraph.

Upon the elapse of a predetermined waiting time until the output value stabilizes (e.g., 2 to 3 seconds), measurement is performed in step S204, and a stable output value En2 (0.370) is detected and stored.

Since this enables detection of the test piece M placement state on the inspection detector 23, i.e., of the fact that the test piece M has been placed in an appropriate inspectable state so that evaluation of test piece surface properties can begin, measurement conditions can be made uniform and a stable output value En2 detected so that operator-caused variability and the like can be eliminated and high accuracy measurement performed.

Removal of the test piece M is controlled as follows.

Figure 11B:
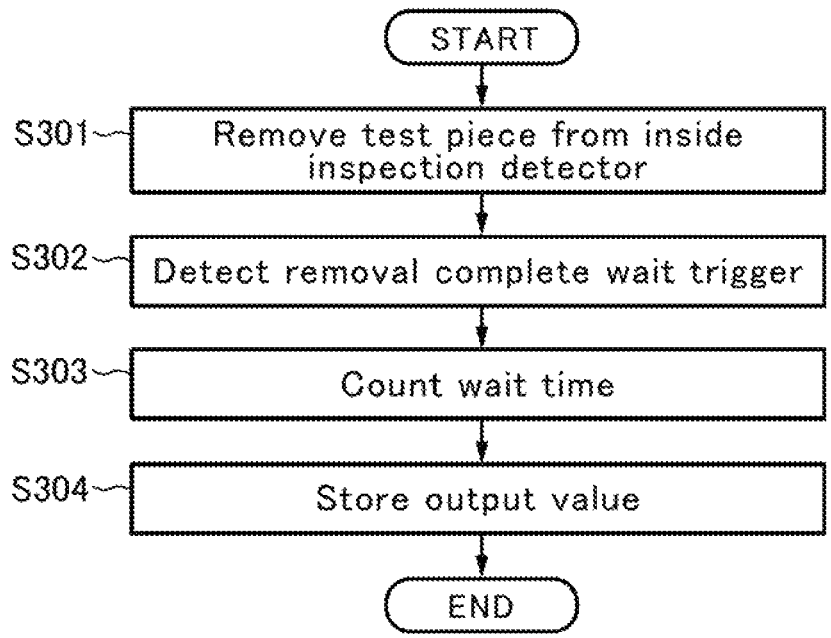
FIG. 11B is an explanatory drawing showing steps from end of measurement until removal of the test piece.

First, when a test piece M is removed from the inspection detector 23 in the step S301 shown in FIG. 11B, the measurement value starts to rise from the output value En2 obtained when the test piece M is in place, as shown in FIG. 10B.

Next, in step S302, the removal completion wait trigger En3, which serves as the criterion for starting a count of the wait time to confirm removal of the test piece (the start of the completion wait in FIG. 10B), is detected. In FIG. 10B, wait time is counted in step S303, using the time when the measurement value reaches 2.500 as the removal completion wait trigger En3. Note that the output value (2.500) serving as the removal completion wait trigger En3 is set by reverse calculation so that the output value becomes stable when the predetermined wait time described in the following paragraph elapses.

When a certain wait time (e.g., 2 to 3 seconds) elapses until the measurement value recovers to close to the initial value Ei0, an output value Ei1 (3.000) is detected in step S304 and stored. At this point the stored output value Ei1 can be used as the inspection offset value Eik.

The fact that the test piece M has been removed can thus be detected, and the next measurement can be performed with the measurement value returned to the initial state.

Controlling the placement and removal of a test piece M as described above enables a simple apparatus constitution, without needing to provide a position sensor or the like to detect whether a test piece M has been appropriately placed relative to an inspection detector 23. Also, by adopting a system combining a transport means for transporting the test piece M from a surface treatment apparatus for performing surface treatment to the surface property inspection device 1 (e.g., a conveyor belt) with a sorting means or the like for sorting inspected test pieces M into good and bad parts, it is possible to consistently perform everything from surface treatment to inspection of test pieces M, allowing an automatable system to be built.

Variant Examples

If the inspection state judgment step S7 is not executed, surface property inspection device 1 may omit the phase comparator 34. For example, a configuration is possible in which the positional relationship between an inspection detector 23 and a test piece M is detected by a position detection means such as a laser displacement gauge, and a determination is made by an optoelectrical sensor (laser) or the like of whether the offset between the inspection detector 23 axis and the test piece M axis is within a predetermined range. The phase comparator 34, frequency adjuster 35, and display means 37 can be integrally disposed by building them into the judgment means 36 or the like.

Effect of the Embodiment

Using the surface property inspection method of the present invention, an eddy current is excited in the test piece M by the inspection detector 23 coil 23b, and the surface properties of the test piece M can be evaluated by comparing the output signal output from the AC bridge circuit 20 with a threshold value. This enables high precision inspection of surface states with a simple circuit configuration. In the resistance ratio setting step S3, a differential value is calculated between the first setting output signal and the second setting output signal, and the resistance ratio is set based on the resistance ratio at which the absolute value of the differential value is maximized, hence the output voltage used for inspection can be increased and the surface treatment state of surface treated material can be more accurately inspected.

What is claimed is:

1. A surface property inspection method for inspecting surface properties of test pieces, comprising:
preparing a surface property inspection apparatus, whereby the surface property inspection apparatus comprises:
an AC bridge circuit;
an AC power supply configured to supply AC power to the AC bridge circuit; and
an evaluation apparatus configured to evaluate the surface properties of the test pieces based on an output signal from the AC bridge circuit;
whereby the AC bridge circuit comprises: a variable resistor constituted so that a resistance ratio between a first resistor and a second resistor is variable; an inspection detector including a coil capable of exciting AC magnetism and formed to dispose the coil so that it excites an eddy current in at least one of the test pieces; and a reference detector for detecting a reference state serving as reference for comparison with the output from the inspection detector; whereby the first resistor, the second resistor, the reference detector, and the inspection detector constitute a bridge circuit;
the method further comprising:
setting the resistance ratio between the first resistor and the second resistor;
acquiring the output signal from the AC bridge circuit by supplying AC power to the AC bridge circuit, in a state whereby the inspection detector is detecting electromagnetic characteristics of at least one of the test pieces, and the reference detector is detecting the reference state; and
evaluating the output signal acquired in the acquiring, the output signal being compared with a predetermined threshold value to evaluate the surface properties of the test pieces; and
the setting comprising:
first signal acquiring wherein first setting output signals are acquired relative to multiple resistance ratios in a state where the test pieces to which surface treatment has not been applied are disposed on the reference detector and the inspection detector, respectively;
second signal acquiring wherein second setting output signals are acquired relative to multiple resistance ratios in a state where one of the test pieces to which surface treatment has not been applied is disposed on the reference detector and one of the test pieces to which surface treatment has been applied is disposed on the inspection detector;
determining the resistance ratio set in the acquiring, based on the first setting output signals acquired in the first signal acquiring and on the second setting output signals acquired in the second signal acquiring.

2. The surface property inspection method of claim 1, wherein in the determining of the resistance ratio, the resistance ratio to be set in the acquiring of the output signal is determined based on the relationships between the first and the second setting output signals which are acquired with respect to the same resistance ratio.

3. The surface property inspection method of claim 2, wherein in the determining of the resistance ratio, the resistance ratio is determined at which an absolute value of the difference between the first setting output signal and the second setting output signal which are acquired with respect to the same resistance ratio, is maximal, and the determined resistance ratio is used in the acquiring of the output signal.

4. The surface property inspection method of claim 1, wherein each of the test pieces has a sloped surface, and the coil of the inspection detector is formed so that a surface of the coil extends along the sloped surface of one of the test pieces to which surface treatment has been applied, and the eddy current is excited on the sloped surface of one of the test pieces.

5. The surface property inspection method of claim 1, wherein the coil of the inspection detector is wound in a convex shape so that the convex shape is inserted into a concave surface of one of the test pieces to which surface treatment has been applied, and the eddy current is excited on the concave surface.

6. The surface property inspection method of claim 1, wherein the coil of the inspection detector is wound on a sloped surface of a bobbin.

7. The surface property inspection method of claim 1, wherein the surface property inspection apparatus further comprises a first inspection detector and a second inspection detector which are mutually opposed; and
the first and the second inspection detectors are disposed on inspection areas of one of the test pieces which are opposed to the respective inspection detectors.

8. The surface property inspection method of claim 7, wherein the surface property inspection apparatus further comprises a transport device configured to transport the test pieces;
whereby each of the test pieces has on both sides surface-treated concave and convex surfaces;
the first inspection detector has a coil wound either in a convex shape for insertion into the concave surface, or in a concave shape to receive the convex surface, so that the eddy current is excited in either the concave surface or the convex surface of one of the test pieces;
the second inspection detector has a coil wound either in a convex shape for insertion into the concave surface, or in a concave shape to receive the convex surface, so that the eddy current is excited in the other either concave surface or convex surface of one of the test pieces; and
the acquiring of the output signal comprising:
first transporting one of the test pieces between the first inspection detector and the second inspection detector;
first acquiring the output signal from the AC bridge circuit by disposing one of the test pieces on the coil of the first inspection detector and exciting the eddy current in the concave surface or the convex surface of one of the test pieces;
second transporting one of the test pieces from the first inspection detector to the second inspection detector; and
second acquiring the output signal from the AC bridge circuit by disposing one of the test pieces on the coil of the second inspection detector and exciting the eddy current in the concave surface or the convex surface of one of the test pieces.

9. A surface property inspection apparatus for inspecting the surface properties of test pieces, comprising:
an AC bridge circuit;
an AC power supply for supplying AC power to the AC bridge circuit; and
an evaluation apparatus for evaluating surface properties of the test pieces based on an output signal from the AC bridge circuit;
whereby the AC bridge circuit comprises: a variable resistor constituted so that a resistance ratio between a first resistor and a second resistor is variable; an inspection detector including a coil capable of exciting AC magnetism and formed to dispose the coil so that it excites an eddy current in one of the test pieces; and a reference detector for detecting a reference state serving as reference for comparison with the output from the inspection detector; whereby the first resistor, the second resistor, the reference detector, and the inspection detector constitute a bridge circuit; and
wherein the coil of the inspection detector is wound in a form of at least one of a cone, a pyramid, a truncated pyramid, or a dome so as to follow a sloped surface of one of the test pieces.

10. The surface property inspection apparatus of claim 9, wherein the coil of the inspection detector is wound in a convex shape and inserted into a concave surface of one of the test pieces to which surface treatment has been applied, so that the eddy current is excited on the concave surface.

11. The surface property inspection apparatus of claim 10, wherein the coil of the inspection detector comprises a bobbin having a convex wall surface and a convex cover covering the outer perimeter surface of the convex wall surface; and conductor of the coil is wound on the outer perimeter surface of the convex wall surface; and
the convex cover covers the wound conductor and is inserted into the concave surface of one of the test pieces so that the eddy current is excited in the concave surface of one of the test pieces to which the surface treatment has been applied.

12. The surface property inspection apparatus of claim 9, wherein the coil of the inspection detector is wound in a concave shape receiving a convex surface of one of the test pieces to which surface treatment is applied, so that the eddy current is excited on the convex surface.

13. The surface property inspection apparatus of claim 12, wherein the coil of the inspection detector comprises a bobbin having a convex wall surface, and conductor of the coil is wound on an outer perimeter surface of the convex wall surface; and
wherein an inner perimeter surface of the bobbin receives a convex surface of one of the test pieces so that the eddy current is excited on the convex surface of one of the test pieces to which the surface treatment has been applied.

14. The surface property inspection apparatus of claim 9, wherein the inspection detector comprises a first inspection detector and a second inspection detector placed in mutual opposition;
whereby each of the test pieces has on both sides concave and convex surfaces to which surface treatment have been applied;
the first inspection detector has a coil wound in a convex shape for insertion into the concave surface so that the eddy current is excited in the concave surface of one of the test pieces; and
the second inspection detector has a coil wound in a concave shape to receive the convex surface so that the eddy current is excited in the convex surface of one of the test pieces.

15. The surface property inspection apparatus of claim 14, further comprising a transport device configured to transport the test pieces, whereby the transport device is constituted to transport the test pieces to either the first inspection detector or the second inspection detector, and after inspection of a first inspection area, to transport one of the test pieces to the other of either the first inspection detector or the second inspection detector, where inspection of a second inspection area on the opposite side of the first inspection area is performed.

\* \* \* \* \*